United States Patent
Chopra et al.

(10) Patent No.: US 10,585,752 B1
(45) Date of Patent: Mar. 10, 2020

(54) INTELLIGENT SNAPSHOT CATALOGING USING SEPARATE LOGICAL CONTAINERS TO REDUCE SNAPSHOT QUERY TIMES

(71) Applicant: EMC IP Holding Company LLC, Hopkinton, MA (US)

(72) Inventors: Shelesh Chopra, Bangalore (IN); Vladimir Mandic, San Jose, CA (US); John Rokicki, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 174 days.

(21) Appl. No.: 15/499,668

(22) Filed: Apr. 27, 2017

(51) Int. Cl.
*G06F 11/14* (2006.01)
*G06F 3/06* (2006.01)

(52) U.S. Cl.
CPC .......... *G06F 11/1435* (2013.01); *G06F 3/065* (2013.01); *G06F 3/067* (2013.01); *G06F 3/0619* (2013.01); *G06F 3/0665* (2013.01); *G06F 11/1451* (2013.01); *G06F 11/1461* (2013.01); *G06F 2201/84* (2013.01)

(58) Field of Classification Search
CPC .... G06F 11/1435; G06F 3/0619; G06F 3/065; G06F 3/0665; G06F 3/067; G06F 11/1451; G06F 11/1461; G06F 2201/84
See application file for complete search history.

(56) References Cited

U.S. PATENT DOCUMENTS

| | | | | |
|---|---|---|---|---|
| 7,747,579 B2 * | 6/2010 | Prahlad | ............... | G06F 11/1435 707/672 |
| 2014/0201150 A1 * | 7/2014 | Kumarasamy | ...... | G06F 11/1451 707/639 |

* cited by examiner

*Primary Examiner* — Reginald G Bragdon
*Assistant Examiner* — Edward Wang
(74) *Attorney, Agent, or Firm* — Staniford Tomita LLP

(57) ABSTRACT

A set of logical containers are maintained in a cache, each logical container corresponding to a portion of a main snapshot catalog. First metadata of a first snapshot created by a first snapshot appliance is examined. Based on the first metadata examination, the first snapshot is cataloged into a first logical container. Second metadata of a second snapshot created by a second snapshot appliance is examined. Based on the second metadata examination, the second snapshot is cataloged into a second logical container, separate from the first logical container. A request is received to perform an operation involving one of the first or second snapshots. The request is matched to one of the first or second logical containers. The one of the first or second logical containers is searched to retrieve a snapshot responsive to the request without searching another of the first or second logical containers.

19 Claims, 8 Drawing Sheets

INTELLIGENT SNAPSHOT CATALOGING USING SEPARATE LOGICAL CONTAINERS TO REDUCE SNAPSHOT QUERY TIMES

TECHNICAL FIELD

Embodiments are generally directed to networked-based data backup methods, and more specifically to cataloging snapshots.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

In today's information-driven society data plays a crucial role in helping enterprises to make decisions, set strategies, develop new products, and analyze trends. Data, however, can be lost in many different ways. For example, data may become corrupted, accidentally deleted, destroyed in a fire, and so forth. It is important for an enterprise to have in place data protection strategies. Traditional backups often require a large amount of time to complete because of the enormous amount of data that may be constantly generated. Thus, many enterprises rely on snapshots as part of their strategy to handle data.

A snapshot includes a set of reference markers for data at a particular point in time. A snapshot acts like a detailed table of contents, providing the user with accessible copies of data that they can roll back to. Snapshots are often created for purposes of data protection such as for disaster recovery when information is lost due to human error or data corruption. Snapshots may also be used for testing application software and data mining.

A snapshot catalog allows, among other things, browsing snapshots so that the user can see and decide the data available to retrieve. Creating a snapshot catalog and subsequently searching the catalog, however, involves a significant amount of time and computing resources because of the often large number snapshots and items in a snapshot.

Therefore, there is a need for improved systems and techniques for cataloging snapshots.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Replicator, and Data Domain Boost are trademarks of Dell EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
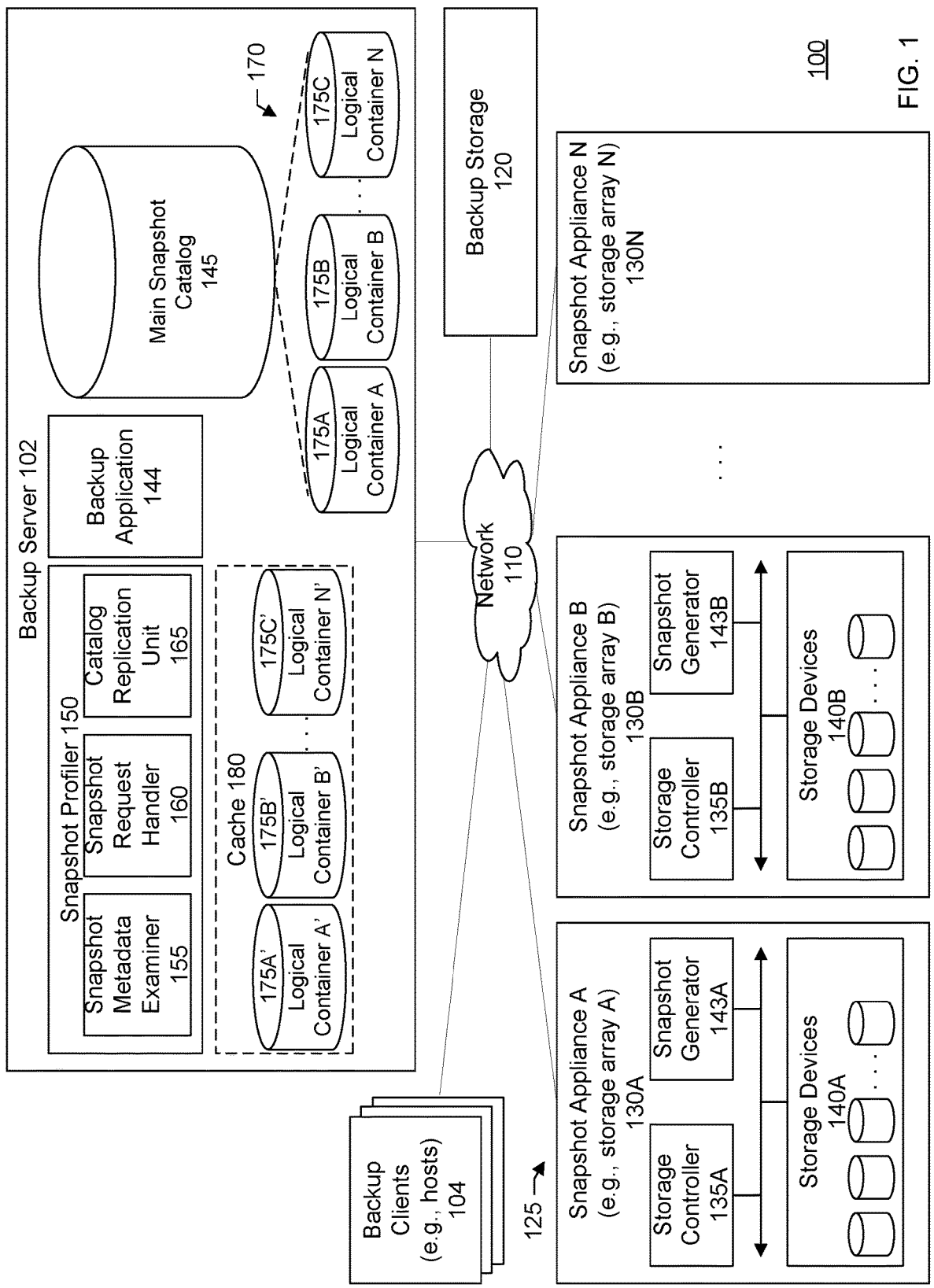
FIG. 1 is a diagram of a large-scale network implementing a system for intelligent snapshot cataloging, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, a computer-readable medium, or a non-transitory computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. A "non-transitory storage medium" or "non-transitory computer-readable storage medium" may include any media that can contain, store, or maintain programs, information, and data. Examples include physical media such as, for example, electronic, magnetic, optical, electromagnetic, or semiconductor media. More specific examples of non-transitory storage medium or non-transitory computer-readable storage medium include a magnetic computer diskette such as floppy diskettes or hard drives, magnetic tape, a random access memory (RAM), a read-only memory (ROM), an erasable programmable read-only memory (EPROM), a flash drive, a compact disc (CD), or a digital video disk (DVD).

Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for intelligent cataloging of snapshots. In an embodiment, there is a backup application that is used as part of a disaster recovery solution for large-scale networks. Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a system for intelligent cataloging of snapshots. In system 100, a number of clients 104 are provided to serve as backup clients, hosts, or nodes. A network or backup server computer 102 is coupled directly or indirectly to these clients through network 110, which may be a cloud network, LAN, WAN, or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be backed up to secondary or backup storage 120. Backup storage includes backup media and may be located at any number of persistent storage locations and devices, such as local client storage, server storage, or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

The example shown in FIG. 1 includes any number of storage arrays 125. A storage array may be referred to as a snapshot appliance. The storage arrays store data for the backup clients or hosts. The clients may access data stored on the storage arrays through a network such as Fiber Channel, Small Computer System Interface (SCSI), Ethernet, Gigabit Ethernet (GbE), or others. A storage array is a data storage system that may be used for block-based, file-based, or object storage. A storage array, such as a first storage array 130A, may include a storage controller 135A and any number of individual storage devices 140A such as hard disk drives, solid-state drives, or both which may pooled into a logical format by the storage controller. The storage controller further facilitates dividing the storage pool into various logical unit numbers (LUNs) that are provisioned to the hosts through volumes. A volume may be mapped to a single LUN or multiple LUNs. The storage controller may provide an interface including an application program interface (API), graphical user interface (GUI), or both through which the functions and services of the storage array can be accessed.

A storage array, such as first storage array 130A, may further include a snapshot generator unit 143A that creates snapshots on the array. Snapshots are instantaneous copy images of volume data, capturing the data exactly as it appeared at the specific point in time when the snapshot was created. Snapshots enable users to save the volume data state, and then access the specific volume data at a later time, whenever needed, including after the source volume has changed. Snapshots can be created very quickly and facilitate data protection techniques such as CDP (Continuous Data Protection), SIDP (Storage Integrated Data Protection), and others.

Figure 2:
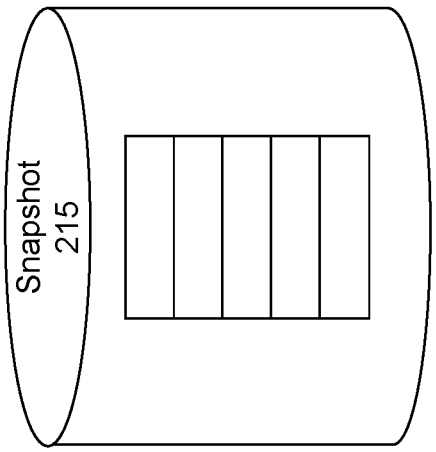
FIG. 2 shows a block diagram of a first state of a snapshot operation example.
Figure 2:
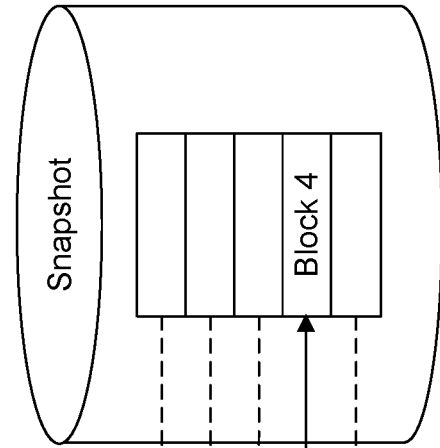
Figure 2:
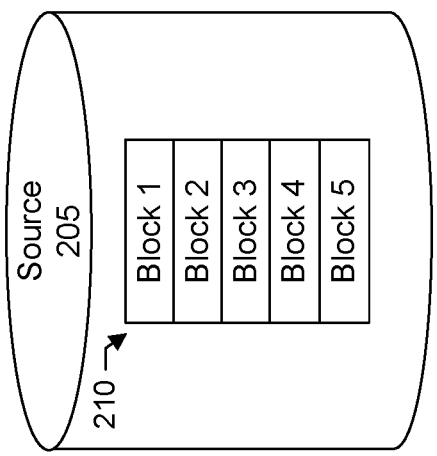
Figure 3:
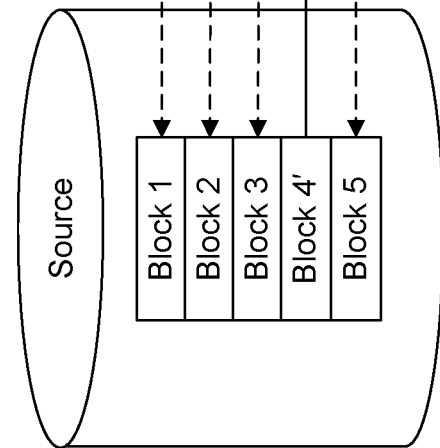
FIG. 3 shows a block diagram of a second state of the snapshot operation.

Snapshots can be used by a backup application 144 on the backup server to facilitate backups. A snapshot can define the backup content by including a set of reference markers or pointers to data stored on a storage device (e.g., disk drive, disk array, storage array, or storage area network (SAN)). A snapshot can provide a state of the system or a virtual copy of data at a particular point-in-time, e.g., time the snapshot was taken. FIGS. 2 and 3 show an example of a snapshot operation. FIG. 2 shows a data source 205 (e.g., source volume) which includes a set of blocks 210 in which data may be stored. In a snapshot backup, a region on storage may be set aside for a snapshot 215.

Referring now to FIG. 3, when a block on the source is changed, the original data in the block may be copied to the snapshot. For example, in FIG. 3, a fourth block in the source has been changed as indicated by "block 4'" and the original data in the block has been written 320 to the snapshot as indicated by "block 4." The snapshot can be accessed to provide a view of the system at the time the snapshot was taken. More particularly, in this example, the snapshot may store the original data from the fourth block and include pointers 325 to the unchanged blocks (e.g., first, second, third, and fifth data blocks) on the source. There are many different types of snapshot methods such as copy-on-write (COW), redirect-on-write, clone or split mirror, incremental snapshots, continuous data protection (CDP) type snapshots, and others.

As discussed, one of the use cases for snapshots is to use them for backup purposes (e.g., using snapshots as one of the backup copies). A successful backup operation including snapshot backups, however, is dependent on many other components and there is a continuing desire to reduce the overall backup time and data retrieval process.

More particularly, referring back now to FIG. 1, once a snapshot is taken, the snapshot may be cataloged into a main snapshot catalog 145. The cataloging allows the snapshot to be later retrieved such as for data restorations, reporting, testing, analytics (e.g., trend analysis), and so forth. Cataloging may include recording and tracking metadata associated with the snapshot such as a snapshot identifier, date and time the snapshot was taken, names of items, files, data objects, or other content in the snapshot, and other metadata. Cataloging may include developing an inventory of items in a snapshot so that the snapshot can be browsed and item retrieval selections made.

Depending upon the needs of an enterprise, snapshots may be generated hourly or even more (or less) frequently. A single snapshot may include many thousands or even millions of directories and files. Further, an enterprise may have a very large number of storage arrays including storage arrays from different vendors, each of which may provide for various different types of snapshot methods, different amounts of storage, different types of individual storage devices, different performance parameters and operating characteristics, and so forth. Cataloging snapshots into a main snapshot catalog and searching the catalog for a snapshot or item in a snapshot, can be very time consuming and processes-intensive. Mounting a snapshot and scanning all the various directories, files, and so forth in the snapshot can consume a large amount of resources.

In a specific embodiment, systems and techniques are provided for intelligent snapshot cataloging. In this specific embodiment, there is a snapshot profiler 150 that examines the metadata associated with a snapshot and, based on the metadata, helps to categorize the snapshot into a particular logical container among a set of other logical containers. When there is a request to retrieve a snapshot, the request is matched to one of the logical containers. The search for the snapshot or snapshot item can be limited to searching that particular logical container which can thus reduce the query time because the main catalog or the other logical containers may not be searched.

In a specific embodiment, snapshots are made efficient and effective by cataloging them in a way which makes it easy for recoveries as well as for querying/reporting and analytics. The snapshot cataloging systems and techniques are modular as well as scalable, improve recovery time objectives (RTO), improve query processing, and facilitate analytics and reporting. In a specific embodiment, a schema is provided that stores the snapshots in a catalog that can be built and queried intelligently. The schema allows for faster processing and reporting for snapshots that are taken in very large numbers and is applicable to native/foreign snapshots. Native snapshots refer to snapshots initiated by the backup application. Foreign snapshots refer to snapshots initiated by a process or an application other than the backup application such as by a user accessing the storage array directly to create the snapshot. Thus, the snapshot cataloging technique can be applied to snapshots generated both inside and outside of the backup system infrastructure.

Some disadvantages of current approaches that are addressed by the snapshot cataloging techniques as described herein include heavy processing time during catalog processing; poor RTO metrics due to the above limitation; inefficient schema leads to longer time to do an overall restore process; heavy overheads on client, server, network, and storage array; serviceability as well as traceability can be difficult to work with; and long wait times for loading the catalog DB/server.

Referring now to FIG. 1, the profiler includes several components or modules including a snapshot metadata examiner 155, snapshot request handler 160, and catalog replication unit 165. In a specific embodiment, the main snapshot catalog database is structured into a set of logical containers or schemas 170 that may be stored on the backup server or other server accessible to the backup server. For example, there can be a first logical container A 175A, a second logical container B 175B, and so forth, in which the logical containers are separate from each other. In a specific embodiment, there is a cache 180 that caches the logical containers or at least portion of the logical containers. It should be appreciated that the blocks shown in FIG. 1 can be functional and there can be many different hardware and software configurations.

Figure 4:
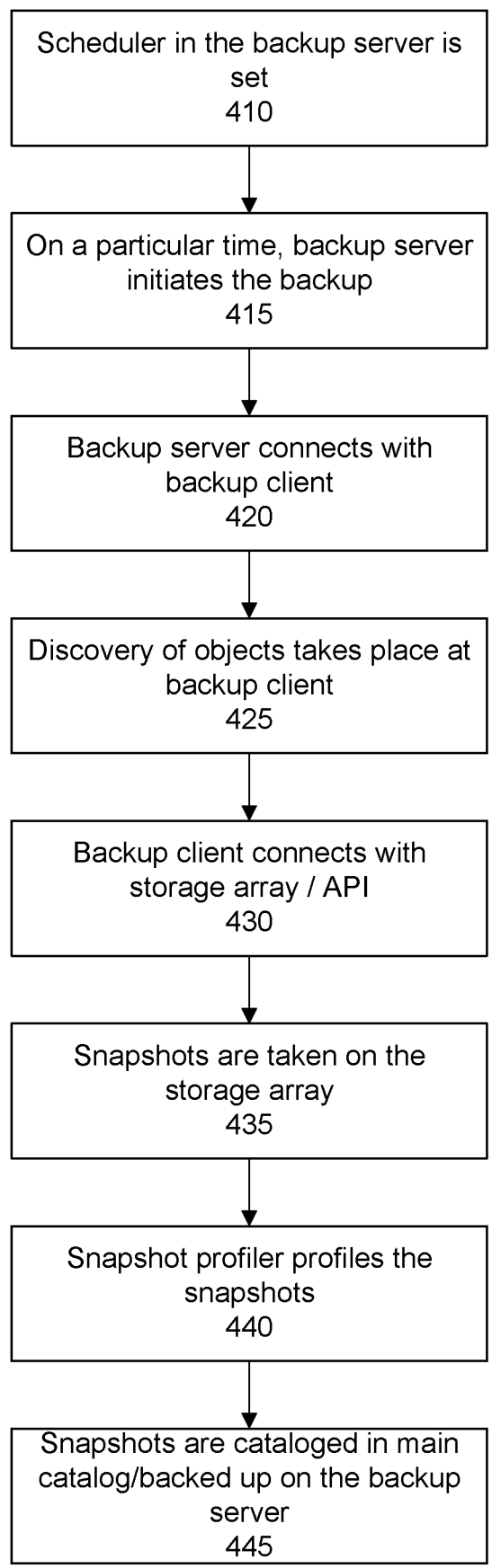
FIG. 4 shows an overall flow for intelligent snapshot cataloging according to a specific embodiment.

In a specific embodiment, the profiler executes a snapshot profiling or snapshot pattern matching process after a snapshot is taken and before the snapshot is cataloged. Based on the examination of the metadata, the snapshot is cataloged into a particular logical container. For example, FIG. 4 shows an overall flow for intelligent snapshot cataloging. In brief, in a step 410, a scheduler in the backup server is set. In a step 415, on or at a particular time per the scheduler, the backup server initiates a backup. In a step 420, the backup server connects with a backup client (or host). In a step 425, discovery of objects takes place at the backup client. In a step 430, the backup client connects with a storage array used by the backup client at which the objects are stored. In a step 435, a snapshot is taken on the storage array. In a step 440, the snapshot profiler profiles the snapshot. In a step 445, the snapshots are cataloged into the main snapshot catalog/backed up by the backup server.

As shown in the flow of FIG. 4, in a specific embodiment, profiling is between the taking of the snapshot (i.e., snap creation) and cataloging. In an embodiment, the profiler profiles the snapshots and based on their respective metadata they are stored separately. In a specific embodiment, the snapshot profiler has multiple responsibilities including pattern matching snapshots based on metadata to a particular logical container, sending or passing the patterned matched snapshot and metadata for cataloging, and acting as a cache-replica for the main snapshot catalog. The cache can be used for reporting/trending and analytics. Using the cache can provide quicker response times as compared to using the main snapshot catalog as loading the main snapshot catalog can take a significant amount of time due to the large number of records or entries that may be present in the main snapshot catalog. The cache is optional and may not be present in some embodiments.

In an embodiment, the snapshot profiler understands the kind and type of snapshots created and collects them into a list to be passed to the main catalog database or a catalog manager managing the catalog database on the backup server. Once profiled, a snapshot can be cataloged into an appropriate logical container based on the metadata associated with the snapshot. In a specific embodiment, the snapshot profiler is a standalone component. For example, the snapshot profiler may reside on its own disk in a proxy server that is separate from the backup server. Depending upon factors such as desired performance, desired cache size, and other factors, the disk may be a solid state drive (SSD) or hard disk drive (HDD). In another specific embodiment, the profiler is bundled along with the backup server. The profiler may be hosted on the same node as the backup server or on a node separate from the backup server. Table A below shows an example of a schema. The metadata is a construct of various key-value pairs that will help profile the snapshots.

A logical container of the snapshots is created based on their metadata. When a request is received for restore, analytics, reporting, or other operation, it is matched to a particular metadata and a search can then be limited to only a single specific container and the remaining containers may remain unsearched. Thus, query times can be reduced because the search may be limited to only the single specific container having the associated snapshot metadata that corresponds to the request. Further, in a specific embodiment, the snapshot profiler cache can function as a replica of the main catalog and can be purged and resynced on a schedule set by the end user.

Referring back now to FIG. 1, the snapshot metadata examiner is responsible for examining metadata associated with a snapshot taken on a storage array to determine the relevant logical container for the snapshot. The metadata examined may include a name of the snapshot appliance or storage array (e.g., a vendor name), version of the array, method used to obtain the snapshot (e.g., copy-on-write, or vendor-specific method), an indication of whether the snapshot was requested by the backup application, an indication of whether the snapshot was in response to an on-demand request from a user accessing the storage array directly (e.g., user accessing array through a GUI and selecting a menu

TABLE A

| Snapshot ID | Snapshot appliance | SnapType | Native/ Foreign | Hostname | SaveSet name | Topology | Timestamp |
|---|---|---|---|---|---|---|---|
| Xx-yy-1111 | VNX | COW | Native | Hostname1 | /FS1 | Local | DD-MON-YY HH:MM:SS |
| Xx-yy-2222 | V3GR | SnapVX | Foreign | Hostname2 | /FS2 | Remote | DD-MON-YY HH:MM:SS |
| Xx-yy-3333 | XIO | COW | Foreign | Hostname3 | /FS3 | Local | DD-MON-YY HH:MM:SS |

A first column of the table labeled "snapshot ID" stores an identifier of the snapshot. A second column labeled "snapshot appliance" identifies the name of the snapshot appliance or storage array on which the snapshot was taken. A third column labeled "snaptype" identifies the method used to create the snapshot. A fourth column labeled "native/foreign" indicates a requestor of the snapshot. As discussed, in an embodiment, "native" indicates that the snapshot was requested by the backup application (native snapshot). "Foreign" indicates that the snapshot was requested by a process or application other than the backup application such as by an administrator accessing the storage array directly to create the snapshot. A fifth column labeled "hostname" identifies the name of the backup client or host to which the storage array is connected. A sixth column labeled "saveset name" identifies the name of the dataset in the snapshot (e.g., volume name). A seventh column labeled "topology" specifies whether the storage array is local or remote with respect to the host. An eighth column labeled "timestamp" stores a date and time when the snapshot was taken.

In an embodiment, once the snapshots have been profiled, a profiled list of snapshots is passed to the catalog DB which, as discussed, can be structured in different schemas. In another specific embodiment, the snapshot profiler can also have its own cache to replicate the catalog or at least a portion of the catalog which can be synced periodically. It should be appreciated that while a specific embodiment of the cataloging technique is for snapshots, aspects and principles of the system can be applied to cataloging any item.

option to create a snapshot), name of host connected to the array, name of saveset (e.g., volume) in the snapshot, an indication of whether the array is local or remote, a date and time the snapshot was generated, other metadata, or combinations of these.

In an embodiment, once a snapshot has been profiled, the snapshot can be cataloged into an appropriate logical container based on the profiling. In a specific embodiment, the snapshots are organized into logical containers based on the storage array in which the snapshot was taken and whether the snapshot is a native or foreign snapshot. As discussed, a native snapshot refers to a snapshot created at the request of the backup application. A native snapshot may be referred to as a managed snapshot. A foreign snapshot refers to a snapshot created independent of the backup application. A foreign snapshot may be referred to as an unmanaged snapshot.

The snapshot request handler is responsible for processing a request for a snapshot or snapshot item, matching the request to a particular logical container, and searching that particular logical container or schema to retrieve a snapshot (or other file or data object in the snapshot) responsive to the request. For example, the request may be to retrieve a particular file that has been snapshotted. The request may include parameters indicating a storage array on which a snapshot including the particular file was taken, whether the snapshot was taken in response to the backup application or in response to another process or snapshot creation request, and so forth.

The snapshot request handler can then match the request to the particular logical container into which the snapshot has been cataloged. A search can then be limited to that particular logical container. For example, there may be a first logical container into which snapshots taken on a first snapshot appliance or storage array have been cataloged. There may be a second logical container into which snapshots taken on a second snapshot appliance, different from the first snapshot appliance, have been cataloged. A request to perform an operation involving a snapshot is received (e.g., restore a file in the snapshot, browse snapshot, delete snapshot, recover snapshot, backup, update, and so forth). A parameter of the request may indicate a snapshot appliance on which the snapshot was taken. If the parameter indicates the snapshot was taken on the first snapshot appliance, the first logical container is searched and the second logical container does not have to be searched. Alternatively, if the parameter indicates the snapshot was taken on the second snapshot appliance, the second logical container is searched and the first logical container does not have to be searched.

The catalog replication unit is responsible maintaining in the cache a replica or copy of at least a portion of the main snapshot catalog. In the example shown in FIG. 1, the cache is shown in broken lines to indicate that the cache is optional and may not be included in some embodiments. In the example shown in FIG. 1, the cache includes cached copies 175A', 175B', and 175C' corresponding to at least portions of logical containers 175A, 175B, and 175C. In an embodiment, the catalog replication unit stores a schedule indicating when the cache should be purged and resynchronized with the main snapshot catalog. The schedule can be configurable such as by the user. In other words, the replication unit can provide a user-configurable schedule identifying the times, dates, frequencies, and so forth that the cached logical containers should be purged and re-synchronized with the main snapshot catalog. The purging/resynching helps to ensure that the cached logical containers or cached portions of the logical containers do not become outdated or stale and remain fresh and up-to-date.

The cache may be stored on a storage device separate from the main snapshot catalog. In an embodiment, the cache storage device may offer higher performance than the main snapshot catalog. For example, the cache storage device may include a solid state drive (SSD) while the main snapshot catalog may be stored on a disk-based hard drive.

Figure 5:
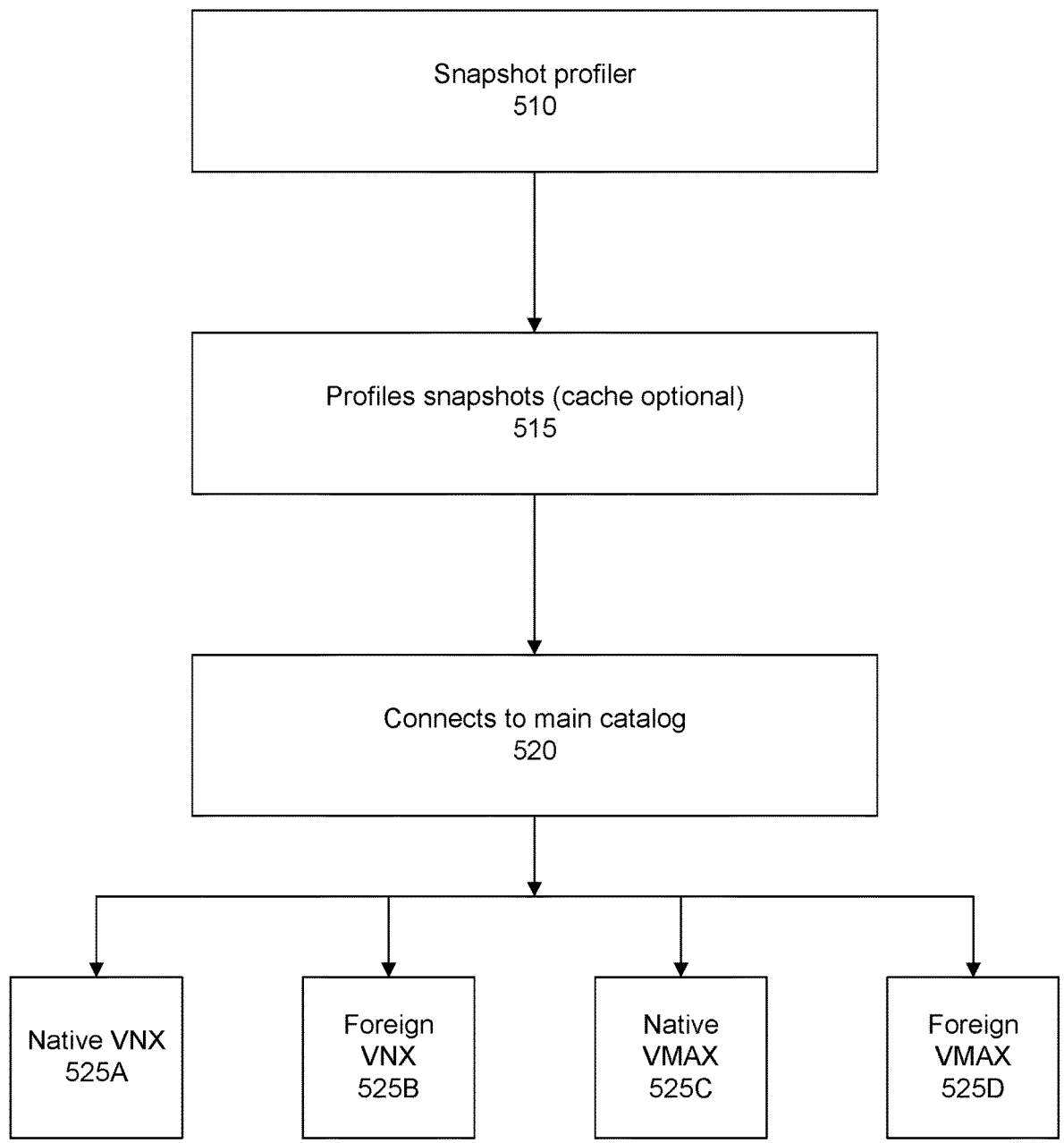
FIG. 5 shows further detail of a flow for intelligently cataloging snapshots into various logical containers according to a specific embodiment.

FIG. 5 shows an overall flow of a profiling process according to a specific embodiment. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 510, a snapshot profiler is provided. In a step 515, the profiler profiles snapshots. The profiling may include obtaining from a snapshot appliance (or storage array) on which a snapshot was taken a set of parameters. A first parameter may indicate a name of the snapshot appliance. A second parameter may indicate whether the snapshot was taken in response to the backup application (i.e., native snapshot) or was taken in response to another process or application (i.e., foreign snapshot). In an embodiment, the profiler may include logic to query the snapshot appliance for metadata relevant to creating the logical containers. For example, the profiler may receive a snapshot or indication of a snapshot taken by a snapshot appliance. The profiler may review metadata that may accompany the snapshot to determine whether the metadata includes parameters for the logical containers such as the first parameter identifying a name of the snapshot appliance, the second parameter identifying whether the snapshot is native or foreign, and so forth. If there are any missing metadata parameters for the logical containers, the profiler may query the snapshot appliance to obtain the missing metadata parameters.

In a step 520, the profiler connects with the main catalog so that the snapshot can be cataloged into the appropriate logical container based on the metadata associated with the snapshot. In the example shown in FIG. 5, there are four logical containers including first, second, third, and fourth logical containers 525A-D. The first logical container is labeled "Native VNX." The second logical container is labeled "Foreign VNX." The third logical container is labeled "Native VMAX." The fourth logical container is labeled "Foreign VMAX." VNX and VMAX are names of storage systems provided by Dell EMC. It should be appreciated, however, that these specific storage systems are provided merely as example and the systems and techniques described can be applied to other storage systems, storage arrays, snapshot appliances, and so forth.

The snapshot profiler may provide the main snapshot catalog (or snapshot catalog manager) with a list of snapshots where the list includes for each snapshot metadata including a name or other identifier of the snapshot appliance on which a snapshot was taken, and an indication of whether or not the snapshot was taken in response to a request from the backup application (e.g., native snapshot) or was not taken in response to the backup application (e.g., foreign snapshot). The metadata allows the snapshot to be cataloged into the appropriate logical container.

For example, if the metadata indicates the snapshot was taken on the VNX appliance and in response to a request from the backup application, the snapshot may be cataloged into the first logical container. If the metadata indicates that the snapshot was taken on the VNX appliance, but not in response to a request from the backup application, the snapshot may be cataloged into the second logical container. If the metadata indicates the snapshot was taken on the VMAX appliance and in response to a request from the backup application, the snapshot may be cataloged into the third logical container. If the metadata indicates that the snapshot was taken on the VMAX appliance, but not in response to a request from the backup application, the snapshot may be cataloged into the fourth logical container.

Figure 6:
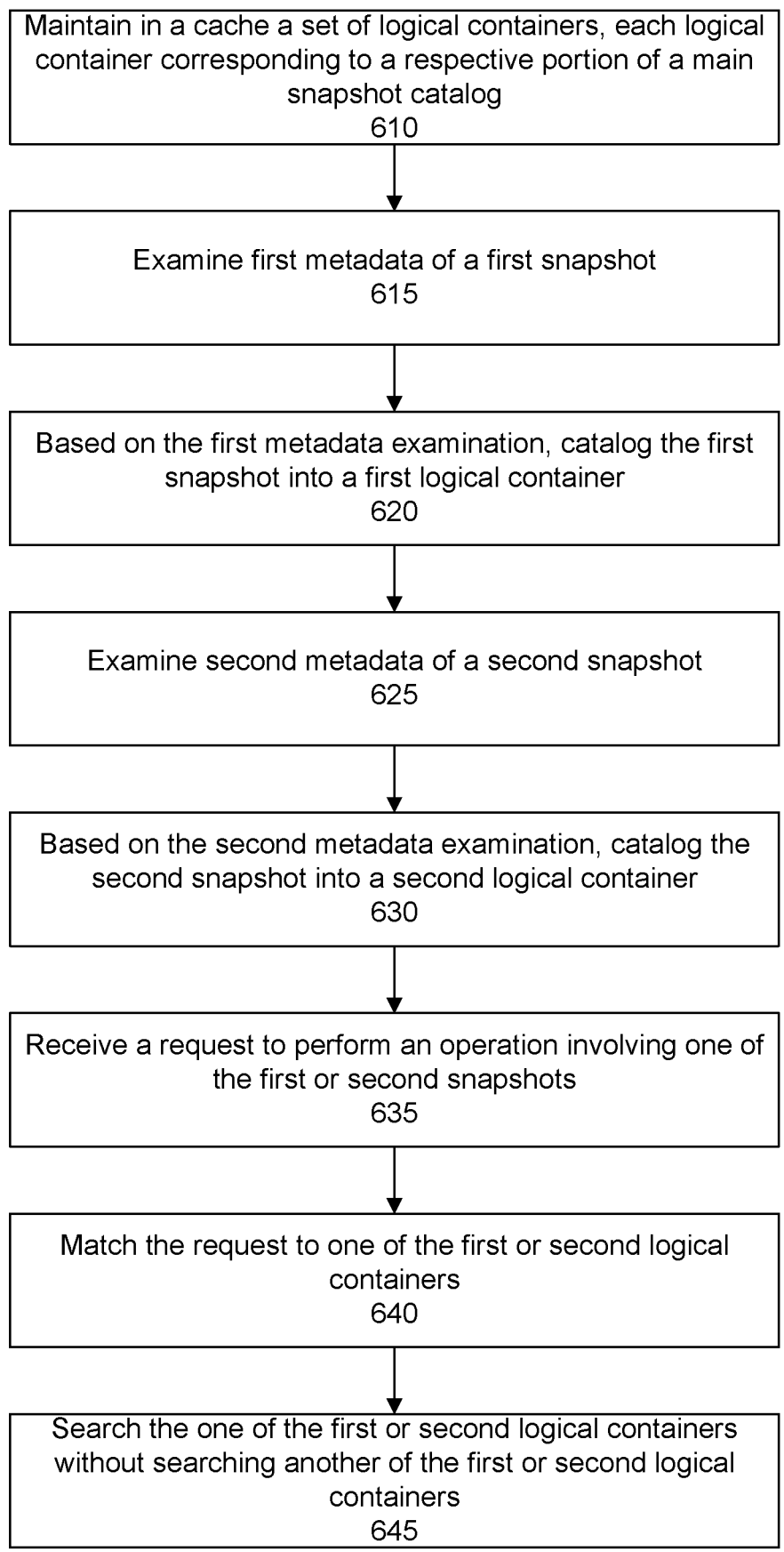
FIG. 6 shows further detail of a flow for intelligently cataloging snapshots into various logical containers according to a specific embodiment.

FIG. 6 shows further detail of a flow for intelligent snapshot cataloging according to a specific embodiment. In brief, in a step 610, a set of logical containers are maintained in a cache, each logical container corresponding to a respective portion of a main snapshot catalog. In a specific embodiment, the logical containers define separate logical groupings or schemas of snapshots based on one or more metadata attributes associated with a snapshot. In a step 615, first metadata of a first snapshot is examined. In a step 620, based on the first metadata examination, the first snapshot is cataloged into a first logical container. In a step 625, second metadata of a second snapshot is examined. In a step 630, based on the second metadata examination, the second snapshot is cataloged into a second logical container, separate or different from the first logical container.

In a step 635, a request is received to perform an operation involving one of the first or second snapshots. The request may include, for example, a request to retrieve a file or item or other content or data object in the snapshot for restore, analytics, or other purpose. In a step 640, the request is matched to one of the first or second logical containers. In a step 645, a search for the snapshot is performed within the matching one of the first or second logical containers without searching another of the first or second logical containers.

In a specific embodiment, the logical containers define groupings of snapshots based on a snapshot appliance on which a snapshot was taken and whether or not the snapshot was or was not created in response to a command from a backup application. In this specific embodiment, parameters associated with the request may identify the snapshot appliance from which the snapshot is to be retrieved and indicate whether or not the snapshot was or was not created in response to a command from the backup application. The metadata information can help guide the search to the relevant logical container in which snapshots taken on the snapshot appliance and under the conditions identified in the request have been cataloged.

In other words, the search can be narrowed to that specific relevant logical container having or associated with the snapshot metadata that matches the parameters of the request. It should be appreciated that any snapshot metadata attribute or combination of attributes may be used to differentiate the snapshot groupings. For example, a grouping configuration may be based on a storage array name, array type, snapshot type or technology, or combinations of these.

In a specific embodiment, a method includes obtaining first metadata associated with a first snapshot, reviewing the first metadata to identify the first snapshot as coming from a first storage array, creating a first logical container to catalog the first snapshot, obtaining second metadata associated with a second snapshot, reviewing the second metadata to identify the second snapshot as coming from a second storage array, different from the first storage array, and creating a second logical container, separate from the first logical container, to catalog the second snapshot.

When, for example, there is a request to browse snapshots taken on one of the first or second storage arrays, the browsing can be limited to the corresponding one of the first or second logical containers. The other logical container does not have to be searched or browsed. As a result, the user, system, or both do not have browse potentially many tens of thousands or even millions of records that may be outside of the corresponding one of the first or second logical containers. Rather, the user, system, or both can access a schema much lighter or with fewer records than the full main catalog schema. Consider, as an example, that are 10,000 records in the main catalog schema, but the particular storage array on which the snapshot was taken that the user is interested in has only two records corresponding to two snapshots taken on the array. Browsing can then be limited to a lightweight schema storing those two records rather than having to potentially pass through 9,998 other records or items in the main catalog. If the desired records are not found in the lightweight schema, the main catalog can then be checked as a final confirmation.

In another specific embodiment, a method includes obtaining first metadata associated with a first snapshot, reviewing the first metadata to identify the first snapshot as coming from a first storage array and having been created in response to a command from a backup application, creating a first logical container to catalog the first snapshot, obtaining second metadata associated with a second snapshot, reviewing the second metadata to identify the second snapshot as coming from the first storage array and having been created in response to a command not from the backup application, and creating a second logical container, separate from the first logical container, to catalog the second snapshot.

The method may include after the creating a first logical container, mounting the first snapshot, scanning the mounted snapshot to identify files in the first snapshot, and storing in the first logical container names of the files identified in the first snapshot. The method may include after the creating a second logical container, mounting the second snapshot, scanning the mounted snapshot to identify files in the second snapshot, and storing in the second logical container a second set of records comprising names of files identified in the second snapshot. A number of records in the first set may be the same as or different from a number of records in the second set.

In another specific embodiment, a method includes obtaining first metadata associated with a first snapshot, reviewing the first metadata to identify an attribute and a corresponding first value of the attribute, creating a first logical container to catalog the first snapshot according to the first value of the attribute, obtaining second metadata associated with a second snapshot, reviewing the second metadata to identify the attribute and a corresponding second value of the attribute, different from the first value, and creating a second logical container, separate from the first logical container, to catalog the second snapshot according to the second value of the attribute.

A corresponding value for the attribute may identify at least one of a name of a snapshot appliance, a type of appliance, or storage array on which a snapshot was taken, an Internet Protocol (IP) address of the snapshot appliance, snapshot appliance globally unique identifier (GUID) or other identifier, logical unit number (LUN) of the snapshot, a snapshot type supported by the appliance and used to generate the snapshot, whether the snapshot was taken in response to a command from a backup application, whether the snapshot was taken in response to a command not from the backup application, whether the snapshot is local, whether the snapshot is remote, whether the snapshot is asynchronous, whether the snapshot is synchronous, or combinations of these.

In a specific embodiment, the logical containers or schemas may be built dynamically based on the information provided by the profiler. For example, in this specific embodiment, the profiler may receive from a user at least one snapshot metadata attribute for grouping snapshots into logical containers. At the start of production operations or runtime, no logical containers may yet exist. During runtime different logical containers may be created as-needed based on the specific corresponding value of the at least one snapshot metadata attribute as snapshots are generated.

Figure 7:
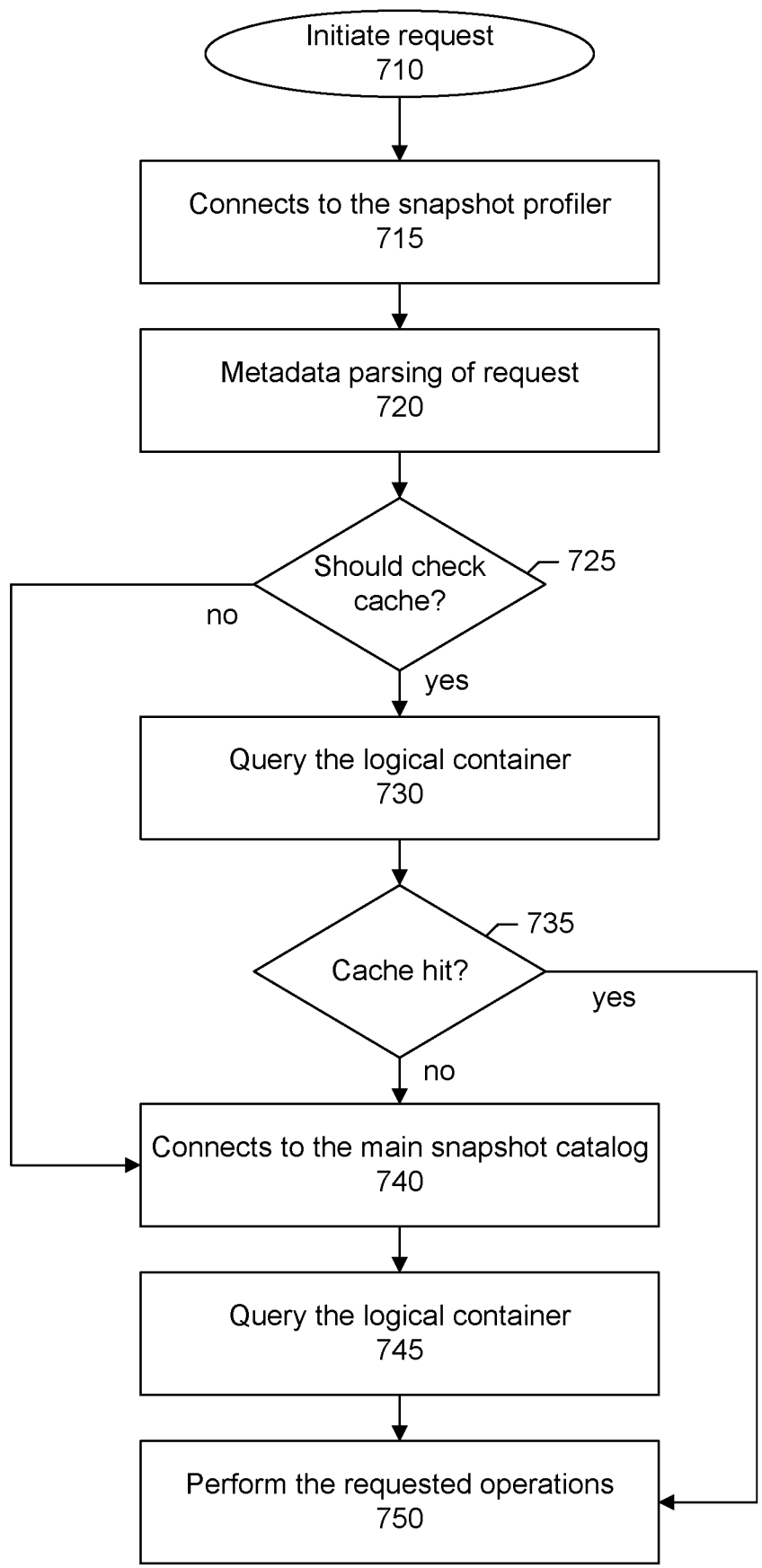
FIG. 7 shows an overall flow for searching a logical container according to a specific embodiment.

FIG. 7 shows an overall flow for processing a snapshot retrieve request such as for reporting, trending, analytics, or recovery (e.g., recovering a file, item, or other content in a snapshot). In a step 710, a request is initiated. For example, the request may be initiated by the backup application such as when the user determines that a file from a snapshot needs to be recovered. The request may be initiated by a process other than the backup application. For example, the user may access the snapshot appliance directly (e.g., through an interface provided by the snapshot appliance) to retrieve a file from a snapshot taken on the snapshot appliance. In a step 715, a connection is made to the snapshot profiler. For example, the connection may be from the backup application (or other application) to the snapshot profiler. In a step 720, the profiler parses metadata from the request. In a specific embodiment, the parsing includes obtaining from the request a first parameter identifying a snapshot appliance on which the snapshot was taken, and a second parameter indicating whether or not the snapshot was taken in response to a command from the backup application.

In a step 725, a determination is made as to whether the cache should be checked. For example, in some embodiments, the cache is optional and may not be included. If the cache is not present or has otherwise been marked as stale or unavailable, a connection is made to the main snapshot catalog (step 740). Records of snapshot metadata from the main catalog may be pulled into the cached logical container. In a step 745, the logical container having the snapshot metadata corresponding to the request is queried to retrieve the desired snapshot. In a step 750, the requested operations are performed on the retrieved snapshot (e.g., mount snapshot, retrieve file from snapshot, update snapshot retention date, purge snapshot, and so forth).

Alternatively, if the cache is present, the cached logical container is queried (step 735). If there is a cache hit, the request operations are performed (step 750). Alternatively, if there is a cache miss, a connection is made to the main snapshot catalog and the logical container structured within the main snapshot catalog is queried (steps 740, 745).

Figure 8:
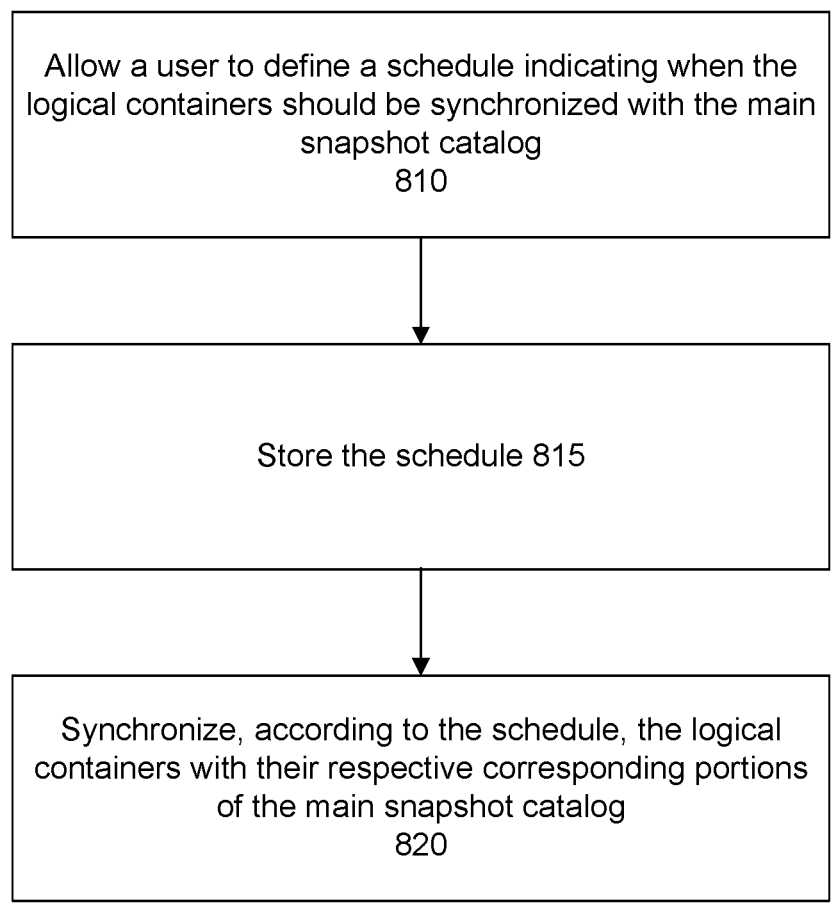
FIG. 8 shows an overall flow for maintaining logical containers in a cache according to a specific embodiment.

FIG. 8 shows a flow for maintaining a cached set of logical containers. In a step 810, a user is allowed to define a schedule indicating when the logical containers in the cache should be purged and synchronized with the main snapshot catalog. In a step 815, the schedule is stored. In a step 820, according to the schedule, the logical containers in the cache are purged and synchronized with their respective corresponding portions of the main snapshot catalog. In an embodiment, the profiler caches at least a portion of the main snapshot catalog. The amount of cache can be user-configurable and may depend on factors such as the amount of cache storage space available.

In a specific embodiment, the profiler includes a set caching options that may be configured by a user such as an administrator. For example, the cache may be configured so that it includes records from each logical container where the included records correspond to the latest snapshots or most recently taken snapshots with respect to a particular snapshot appliance.

Consider, as an example, that there are a total of two different snapshot appliances and each snapshot appliance is configured to allow both native and foreign snapshots. In this example, there may thus be four separate logical containers. A first logical container may catalog native snapshots taken on a first snapshot appliance. A second logical container may catalog foreign snapshots taken on the first snapshot appliance. A third logical container may catalog native snapshots taken on a second snapshot appliance. A fourth logical container may catalog foreign snapshots taken on the second snapshot appliance. The cache may include at least portions, entries, or records of each of the first, second, third, and fourth logical containers. The first logical container in the cache may include a set of records corresponding to native snapshots most recently taken on the first snapshot appliance. The second logical container in the cache may include a set of records corresponding to foreign snapshots most recently taken on the first snapshot appliance. The third logical container in the cache may include a set of records corresponding to native snapshots most recently taken on the second snapshot appliance. The fourth logical container in the cache may include a set of records corresponding to foreign snapshots most recently taken on the fourth snapshot appliance.

As another example, the cache may be configured so that it includes records corresponding to snapshots most recently taken with respect to the snapshot appliances as a whole. Consider again the example above where the first logical container catalogs native snapshots taken on a first snapshot appliance, the second logical container catalogs foreign snapshots taken on the first snapshot appliance, the third logical container catalogs native snapshots taken on a second snapshot appliance, and the fourth logical container catalogs foreign snapshots taken on the second snapshot appliance.

In this example, the cache includes a set of records corresponding to snapshots most recently taken regardless of snapshot appliance. If, for example, the cache includes storage for ten records, those ten records may correspond to snapshots most recently taken throughout the system. Each record of the ten records may be for snapshots taken on the first snapshot appliance if the ten snapshots are the most recent snapshots taken with respect to all other snapshots taken across all snapshot appliances. As another example, eight of the ten records may correspond to snapshots taken on the first snapshot appliance and the remaining two records may correspond to snapshots taken on the second snapshot appliance. In this example, the ten records correspond to snapshots most recently taken when considering snapshots taken by both the first and second snapshot appliances as a whole.

Figure 9:
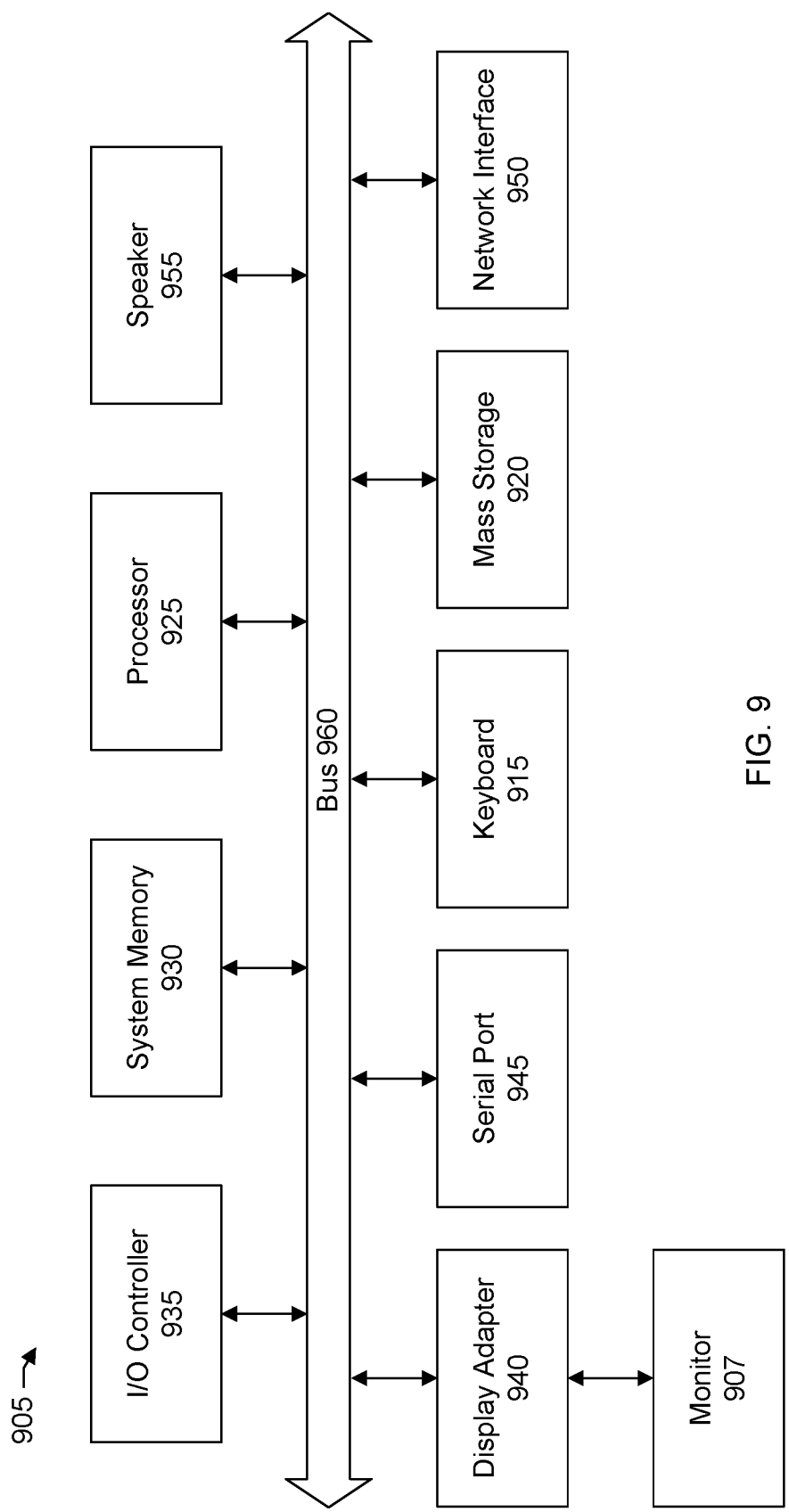
FIG. 9 shows a block diagram of a computer system suitable for use with the system, under some embodiments.

FIG. 9 shows a system block diagram of a computer system 905 used to execute the software of the present system described herein. The computer system includes a monitor 907, keyboard 915, and mass storage devices 920. Computer system 905 further includes subsystems such as central processor 925, system memory 930, input/output (I/O) controller 935, display adapter 940, serial or universal serial bus (USB) port 945, network interface 950, and speaker 955. The system may also be used with computer systems with additional or fewer subsystems. For example, a computer system could include more than one processor 925 (i.e., a multiprocessor system) or a system may include a cache memory.

Arrows such as 960 represent the system bus architecture of computer system 905. However, these arrows are illustrative of any interconnection scheme serving to link the subsystems. For example, speaker 955 could be connected to the other subsystems through a port or have an internal direct connection to central processor 925. The processor may include multiple processors or a multicore processor, which may permit parallel processing of information. Computer system 905 shown in FIG. 9 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, a method includes: maintaining, in a cache, a plurality of logical containers, each logical container corresponding to a portion of a main snapshot catalog; examining first metadata of a first snapshot created by a first snapshot appliance; based on the examining first metadata, cataloging the first snapshot into a first logical container; examining second metadata of a second snapshot created by a second snapshot appliance, different from the first snapshot appliance; based on the examining second metadata, cataloging the second snapshot into a second logical container, separate from the first logical container; receiving a request to perform an operation involving one of the first or second snapshots; matching the request to one of the first or second logical containers in the cache; and searching the one of the first or second logical containers in the cache to retrieve a snapshot responsive to the request without searching another of the first or second logical containers in the cache.

The method may include upon the searching the one of the first or second logical containers in the cache, receiving an indication of a cache miss; and based on the cache miss, searching the main snapshot catalog. The method may include storing a schedule specifying when the first and second logical containers should be synchronized with their respective corresponding portions of the main snapshot catalog; synchronizing, according to the schedule, the first logical container and a first corresponding portion of the main snapshot catalog to update the first logical container with snapshot metadata associated with snapshots most recently taken on the first snapshot appliance; and synchronizing, according to the schedule, the second logical container and a second corresponding portion of the main snapshot catalog to update the second logical container with snapshot metadata associated with snapshots most recently taken on the second snapshot appliance.

The method may include examining third metadata of a third snapshot created by the first snapshot appliance; and based on the examining third metadata, cataloging the third snapshot into a third logical container, separate from the first and second logical containers, wherein the third metadata indicates that the third snapshot was created in response to a command from a backup application, and the first metadata indicates that the first snapshot was created without having received the command from the backup application. The method may include: storing the cache having the plurality of logical containers on a first storage device; and storing the main catalog on a second storage device, different from the first storage device, wherein a performance of the first storage device is greater than the performance of the second storage device.

Cataloging the first snapshot into a first logical container may include recording a name of the first snapshot appliance; and recording a type of snapshot method used by the first snapshot appliance to create the first snapshot.

In another specific embodiment, there is a system for intelligent snapshot cataloging, the system comprising: a processor-based system executed on a computer system and configured to: maintain, in a cache, a plurality of logical containers, each logical container corresponding to a portion of a main snapshot catalog; examine first metadata of a first snapshot created by a first snapshot appliance; based on the examination of first metadata, catalog the first snapshot into a first logical container; examine second metadata of a second snapshot created by a second snapshot appliance, different from the first snapshot appliance; based on the examination of second metadata, catalog the second snapshot into a second logical container, separate from the first logical container; receive a request to perform an operation involving one of the first or second snapshots; match the request to one of the first or second logical containers in the cache; and search the one of the first or second logical containers in the cache to retrieve a snapshot responsive to the request without searching another of the first or second logical containers in the cache.

In another specific embodiment, there is a computer program product, comprising a non-transitory computer-readable medium having a computer-readable program code embodied therein, the computer-readable program code adapted to be executed by one or more processors to implement a method comprising: maintaining, in a cache, a plurality of logical containers, each logical container corresponding to a portion of a main snapshot catalog; examining first metadata of a first snapshot created by a first snapshot appliance; based on the examining first metadata, cataloging the first snapshot into a first logical container; examining second metadata of a second snapshot created by a second snapshot appliance, different from the first snapshot appliance; based on the examining second metadata, cataloging the second snapshot into a second logical container, separate from the first logical container; receiving a request to perform an operation involving one of the first or second snapshots; matching the request to one of the first or second logical containers in the cache; and searching the one of the first or second logical containers in the cache to retrieve a snapshot responsive to the request without searching another of the first or second logical containers in the cache.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:

maintaining, in a cache, a plurality of logical containers, each logical container corresponding to a portion of a main snapshot catalog, the plurality of logical containers defining separate logical groupings of snapshots based on metadata associated with the snapshots;

examining, by a snapshot profiler, first metadata of a first snapshot created by a first snapshot appliance, the first snapshot having been requested by a backup application that is responsible for backing up a plurality of client hosts;

based on the examining first metadata, storing, by the snapshot profiler, the first snapshot in a first logical container, the first logical container being associated with a first pattern of metadata corresponding to the first metadata;

examining, by the snapshot profiler, second metadata of a second snapshot created by a second snapshot appliance, different from the first snapshot appliance, the second snapshot having been requested by a process not initiated by the backup application;

based on the examining second metadata, determining, by the snapshot profiler, that the second snapshot should be stored separately from the first snapshot because the first snapshot was requested by the backup application while the second snapshot was not, and storing, by the snapshot profiler, the second snapshot in a second logical container, separate from the first logical container, the second logical container being associated with a second pattern of metadata corresponding to the second metadata;

receiving a request to perform an operation involving one of the first or second snapshots;

parsing metadata from the request;

pattern matching metadata parsed from the request to one of the first or second logical containers in the cache based on the first and second patterns of metadata;

determining from the pattern matching that the metadata parsed from the request matches one of the first pattern of metadata associated with the first logical container or the second pattern of metadata associated with the second logical container; and searching the one of the first or second logical containers in the cache to retrieve a snapshot responsive to the request and stored in the one of the first or second logical containers without searching another of the first or second logical containers in the cache, the one of the first or second logical containers searched being associated with a pattern of metadata that matches the metadata parsed from the request.

2. The method of claim 1 comprising:

upon the searching the one of the first or second logical containers in the cache, receiving an indication of a cache miss; and based on the cache miss, searching the main snapshot catalog.

3. The method of claim 1 comprising:

storing a schedule specifying when the first and second logical containers should be synchronized with their respective corresponding portions of the main snapshot catalog;

synchronizing, according to the schedule, the first logical container and a first corresponding portion of the main snapshot catalog to update the first logical container with snapshot metadata associated with snapshots most recently taken on the first snapshot appliance; and synchronizing, according to the schedule, the second logical container and a second corresponding portion of the main snapshot catalog to update the second logical container with snapshot metadata associated with snapshots most recently taken on the second snapshot appliance.

4. The method of claim 1 comprising:

examining, by the snapshot profiler, third metadata of a third snapshot created by the first snapshot appliance; and based on the examining third metadata, determining, by the snapshot profiler, that the third snapshot should be stored separately from the first snapshot because the third snapshot was requested by the process not initiated by the backup application, and storing the third snapshot in the second logical container.

5. The method of claim 1 comprising:

storing the cache having the plurality of logical containers on a first storage device; and storing the main catalog on a second storage device, different from the first storage device, wherein a performance of the first storage device is greater than the performance of the second storage device.

6. The method of claim 1 wherein the storing the first snapshot in a first logical container comprises:

recording a name of the first snapshot appliance; and recording a type of snapshot method used by the first snapshot appliance to create the first snapshot.

7. The method of claim 1 comprising:

updating a first schema of the first logical container with the first metadata of the first snapshot; and updating a second schema of the second logical container, separate from the first schema, with the second metadata of the second snapshot.

8. A system for intelligent snapshot cataloging, the system comprising: a processor-based system executed on a computer system and configured to:

maintain, in a cache, a plurality of logical containers, each logical container corresponding to a portion of a main snapshot catalog, the plurality of logical containers defining separate logical groupings of snapshots based on metadata associated with the snapshots;

examine, by a snapshot profiler, first metadata of a first snapshot created by a first snapshot appliance;

based on the examination of first metadata, catalog, by the snapshot profiler, the first snapshot into a first logical container;

examine, by the snapshot profiler, second metadata of a second snapshot created by a second snapshot appliance, different from the first snapshot appliance;

based on the examination of second metadata, catalog, by the snapshot profiler, the second snapshot into a second logical container, separate from the first logical container;

receive a request to perform an operation involving one of the first or second snapshots;

match the request to one of the first or second logical containers in the cache; and search the one of the first or second logical containers in the cache to retrieve a snapshot responsive to the request and stored in the one of the first or second logical containers without searching another of the first or second logical containers in the cache.

9. The system of claim 8 wherein the processor-based system is configured to:

upon the searching the one of the first or second logical containers in the cache, receive an indication of a cache miss; and based on the cache miss, search the main snapshot catalog.

10. The system of claim 8 wherein the processor-based system is configured to:

store a schedule specifying when the first and second logical containers should be synchronized with their respective corresponding portions of the main snapshot catalog;

synchronize, according to the schedule, the first logical container and a first corresponding portion of the main snapshot catalog to update the first logical container with snapshot metadata associated with snapshots most recently taken on the first snapshot appliance; and synchronize, according to the schedule, the second logical container and a second corresponding portion of the main snapshot catalog to update the second logical container with snapshot metadata associated with snapshots most recently taken on the second snapshot appliance.

11. The system of claim 8 wherein the processor-based system is configured to:

examine third metadata of a third snapshot created by the first snapshot appliance; and based on the examination of third metadata, catalog the third snapshot into a third logical container, separate from the first and second logical containers, wherein the third metadata indicates that the third snapshot was created in response to a command from a backup application, and the first metadata indicates that the first snapshot was created without having received the command from the backup application.

12. The system of claim 8 wherein the processor-based system is configured to:

store the cache having the plurality of logical containers on a first storage device; and store the main catalog on a second storage device, different from the first storage device, wherein a performance of the first storage device is greater than the performance of the second storage device.

13. The system of claim 8 wherein the processor-based system is configured to:

recording a name of the first snapshot appliance; and recording a type of snapshot method used by the first snapshot appliance to create the first snapshot.

14. A computer program product, comprising a non-transitory computer-readable medium having a computer-readable program code embodied therein, the computer-readable program code adapted to be executed by one or more processors to implement a method comprising:

maintaining, in a cache, a plurality of logical containers, each logical container corresponding to a portion of a main snapshot catalog, the plurality of logical containers defining separate logical groupings of snapshots based on metadata associated with the snapshots;

examining, by a snapshot profiler, first metadata of a first snapshot created by a first snapshot appliance, the first snapshot having been requested by a backup application that is responsible for backing up a plurality of client hosts;

based on the examining first metadata, cataloging, by the snapshot profiler, the first snapshot into a first logical container, the first logical container being associated with a first pattern of metadata corresponding to the first metadata, and the cataloging the first snapshot comprising updating a first schema of the first logical container with the first metadata;

examining, by the snapshot profiler, second metadata of a second snapshot created by a second snapshot appliance, different from the first snapshot appliance, the second snapshot having been requested by a process not initiated by the backup application;

based on the examining second metadata, determining, by the snapshot profiler, that the second snapshot should be stored separately from the first snapshot because the first snapshot was requested by the backup application while the second snapshot was not, and cataloging, by the snapshot profiler, the second snapshot into a second logical container, separate from the first logical container, the second logical container being associated with a second pattern of metadata corresponding to the second metadata, and the cataloging the second snapshot comprising updating a second schema of the second logical container with the second metadata;

receiving a request to perform an operation involving one of the first or second snapshots;

parsing metadata from the request;

pattern matching the metadata parsed from the request to one of the first or second logical containers in the cache based on the first and second patterns of metadata associated with the respective first and second logical containers; and searching the one of the first schema of the first logical container or second schema of the second logical container in the cache to retrieve a snapshot responsive to the request and stored in the one of the first or second logical containers without searching another of the first schema of the first logical container or second schema of the second logical container in the cache, wherein the process not initiated by the backup application comprises a user issuing a request for the second snapshot directly to the second snapshot appliance and independent of the backup application.

15. The computer program product of claim 14 wherein the method comprises:

upon the searching the one of the first schema of the first logical container or second schema of the second logical container in the cache, receiving an indication of a cache miss; and based on the cache miss, searching the main snapshot catalog.

16. The computer program product of claim 14 wherein the method comprises:

storing a schedule specifying when the first and second logical containers should be synchronized with their respective corresponding portions of the main snapshot catalog;

synchronizing, according to the schedule, the first logical container and a first corresponding portion of the main snapshot catalog to update the first logical container with snapshot metadata associated with snapshots most recently taken on the first snapshot appliance; and synchronizing, according to the schedule, the second logical container and a second corresponding portion of the main snapshot catalog to update the second logical container with snapshot metadata associated with snapshots most recently taken on the second snapshot appliance.

17. The computer program product of claim 14 wherein the method comprises:

examining, by the snapshot profiler, third metadata of a third snapshot, the third snapshot having been requested by the process not initiated by the backup application;

based on the examining third metadata, determining, by the snapshot profiler, that the third snapshot should be stored separately from the first snapshot because the third snapshot was requested by the process not initiated by the backup application, and storing the third snapshot in the second logical container;

examining, by the snapshot profiler, fourth metadata of a fourth snapshot, the fourth snapshot having been requested by the backup application; and based on the examining fourth metadata, determining, by the snapshot profiler, that the fourth snapshot should be stored with the first snapshot because the fourth snapshot was requested by the backup application, and storing the fourth snapshot in the first logical container.

18. The computer program product of claim 14 wherein the method comprises:

storing the cache having the plurality of logical containers on a first storage device; and storing the main catalog on a second storage device, different from the first storage device, wherein a performance of the first storage device is greater than the performance of the second storage device.

19. The computer program product of claim 14 wherein the cataloging the first snapshot into a first logical container comprises:

recording a name of the first snapshot appliance; and recording a type of snapshot method used by the first snapshot appliance to create the first snapshot.

* * * * *